United States Patent
Wang

(10) Patent No.: US 9,778,822 B2
(45) Date of Patent: Oct. 3, 2017

(54) TOUCH INPUT METHOD AND ELECTRONIC APPARATUS THEREOF

(71) Applicant: GETAC TECHNOLOGY CORPORATION, Hsinchu County (TW)

(72) Inventor: Chen-Ping Wang, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 48 days.

(21) Appl. No.: 14/750,943

(22) Filed: Jun. 25, 2015

(65) Prior Publication Data

US 2016/0154466 A1    Jun. 2, 2016

(30) Foreign Application Priority Data

Nov. 28, 2014   (CN) .......................... 2014 1 0709691

(51) Int. Cl.
*G09G 5/00* (2006.01)
*G06F 3/0482* (2013.01)
*G06F 3/041* (2006.01)
*G06F 3/0488* (2013.01)

(52) U.S. Cl.
CPC .......... *G06F 3/0482* (2013.01); *G06F 3/0416* (2013.01); *G06F 3/04883* (2013.01)

(58) Field of Classification Search
CPC ......... G06F 3/041; G06F 3/04883; G06F 3/01
USPC .......................................... 715/863; 345/173
See application file for complete search history.

(56) References Cited

U.S. PATENT DOCUMENTS

| | | | | |
|---|---|---|---|---|
| 2008/0270936 A1* | 10/2008 | Bebrisson | ............. | G06F 3/0481 715/788 |
| 2011/0310049 A1* | 12/2011 | Homma | ............... | G06F 3/04886 345/173 |
| 2012/0042283 A1* | 2/2012 | Tuesta | .................. | G06F 3/0482 715/834 |
| 2013/0019200 A1* | 1/2013 | Montague | ........... | G06F 3/04845 715/800 |
| 2013/0042202 A1* | 2/2013 | Mikami | .................. | H04M 1/67 715/781 |
| 2014/0143738 A1* | 5/2014 | Underwood, IV | ...... | H04L 51/38 715/863 |
| 2015/0212724 A1* | 7/2015 | Manba | .................. | G06F 3/0488 715/794 |

* cited by examiner

*Primary Examiner* — Jennifer Nguyen

(57) ABSTRACT

A touch input method and an electronic apparatus thereof are provided. The touch input method is adapted to a touch module and includes the following steps. A first position of a terminal point of a sliding trail and a second position of a click action are obtained on a defined plane of the touch module. There is a time interval between the times of obtaining the first position and the second position. On the defined plane, the first position is utilized as an origin to define a plurality of quadrants for determining a relative distance between the first position and the second position and for determining which quadrant the second position is located. According to the relative distance, the quadrant where the second position is located, and the time interval, it is determined whether to execute a specific function.

18 Claims, 7 Drawing Sheets

TOUCH INPUT METHOD AND ELECTRONIC APPARATUS THEREOF

BACKGROUND OF THE DISCLOSURE

Field of the Invention

The invention relates to an input method, and more particularly to a touch input method and an electronic apparatus thereof.

Description of Related Art

With the development of technology, many different electronic apparatus, such as personal computer, laptop or mobile apparatus, come out successively and are broadly used in daily lives. When using the electronic apparatus, users usually require input interfaces such as keyboards, mice, and touch panels to input characters, give commands and control the cursor on a display screen. Generally speaking, many electronic apparatus are equipped with a mouse as a tool for controlling the cursor; however, for laptops or mobile apparatus, an external mouse needs to be carried and installed separately and requires a certain manipulating space when being used, which rather causes inconvenience. In contrast, laptops or mobile apparatus commonly substitute a touch panel for a mouse, so that the user is able to control the cursor on the display screen via the touch panel.

However, although the user is able to control the cursor on the display screen with the touch panel, it is difficult to nimbly perform manipulations such as select, click, call menu, execute and drag directly via the touch panel. Therefore, current touch panels can't replace the mouse and have to be used together with actual left and right keys to provide better manipulation. In other words, it is still one of the objectives that persons skilled in the art strive to achieve to provide a more preferable touch input method using a touch module having touch functions.

SUMMARY OF THE INVENTION

A touch input method and an electronic apparatus thereof are provided for users to perform swifter manipulating behaviors.

The touch input method is adapted to a touch module and includes the following steps. A first position of a terminal point of a sliding trail is obtained on a defined plane of the touch module. A second position of a click action is obtained on the defined plane of the touch module, wherein there is a time interval between the times of obtaining the first position and the second position. On the defined plane, the first position is utilized as an origin to define a plurality of quadrants for determining a relative distance between the first position and the second position and for determining which quadrant the second position is located. According to the relative distance, the quadrant where the second position is located and the time interval, it is determined whether to execute a specific function.

The electronic apparatus includes a touch module, a capture unit, an operation unit and a control unit. The touch module has a defined plane, and the capture unit is coupled to the touch module. The capture unit obtains a first position of a terminal point of a sliding trail on the defined plane of the touch module and obtains a second position of a click action on the defined plane of the touch module, wherein there is a time interval between the times of obtaining the first position and the second position. The operation unit is coupled to the capture unit and utilizes the first position as an origin to define a plurality of quadrants on the defined plane for determining a relative distance between the first position and the second position and for determining which quadrant the second position is located. The control unit is coupled to the capture unit and the operation unit and determines whether to execute a specific function according to the relative distance, the quadrant where the second position is located and the time interval.

Based on the above, the touch input method and the electronic apparatus thereof first obtain the first position representing the terminal point of the sliding trail and the second position representing the position of the click action, and then determine whether to execute the specific function according the time interval between obtaining the first position and the second position, the relative distance between the first position and the second position and the quadrant where the second position is located with respect to the first position. In other words, the user uses the touch input method on the touch module to execute the specific function, so as that a swifter manipulating behavior is provided.

In order to make the aforementioned and other features and advantages of the disclosure comprehensible, several exemplary embodiments accompanied by figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Reference will now be made in detail to the exemplary embodiments of the invention, examples of which are illustrated in the accompanying drawings. In addition, whenever possible, identical or similar reference numbers stand for identical or similar elements in the figures and the embodiments.

Figure 1:
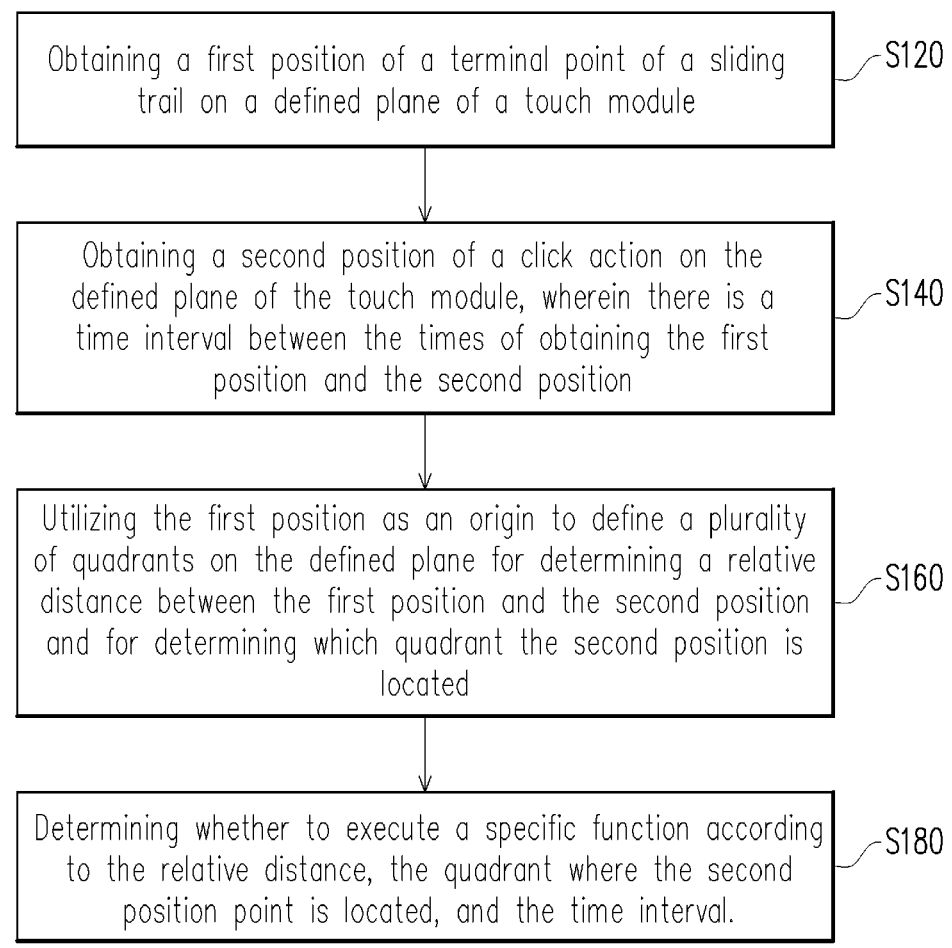
FIG. 1 is a flowchart showing a touch input method according to an embodiment of the invention.

FIG. 1 is a flowchart showing a touch input method according to an embodiment of the invention. The touch input method introduced in the invention is adapted for an electronic apparatus having a touch module. The electronic device is, for example, a personal computer, a laptop, a tablet, or a smart phone, but the invention is not limited thereto. The touch module is, for example, a touch panel commonly seen in electronic apparatus, wherein the touch panel supports multi-touch functions so that the user is able to control the cursor on a display screen and may be a resistive touch panel, a capacitive touch panel or an electromagnetic touch panel, but the invention is not limited thereto. Generally speaking, the electronic apparatus further includes a display and a storage unit. The display is used for displaying various articles and cursors on the display screen, while the storage unit, such as a hard disk or a non-volatile memory, is used for storing a variety of information and data obtained by the electronic apparatus.

Referring to FIG. 1, steps of the touch input method in this embodiment are as the following. First, a first position of a terminal point of a sliding trail is obtained on a defined plane of the touch module (step S120). Next, a second position of a click action is obtained on the defined plane of the touch module, wherein there is a time interval between the time of obtaining the first position and the time of obtaining the second position (step S140). On the defined plane, the first position is utilized as an origin to define a plurality of quadrants for determining a relative distance between the first position and the second position and for determining which quadrant the second position is located (step S160). Lastly, according to the relative distance, the quadrant where the second position is located, and the time interval, it is determined whether to execute a specific function (step S180).

More particularly, the touch panel serves as an input interface for the electronic apparatus, and the user may use objects like a finger or a touch pen to perform actions such as press, click and slide on the touch module, so as to control the cursor on the display screen to give commands such as select, execute or drag. However, in this embodiment, the touch input method further confirms the intention of the user via capturing, identifying and analyzing a plurality of positions and executes the specific function correspondingly. It is worth noting that the specific function is, for example, calling a content menu.

Figure 2:
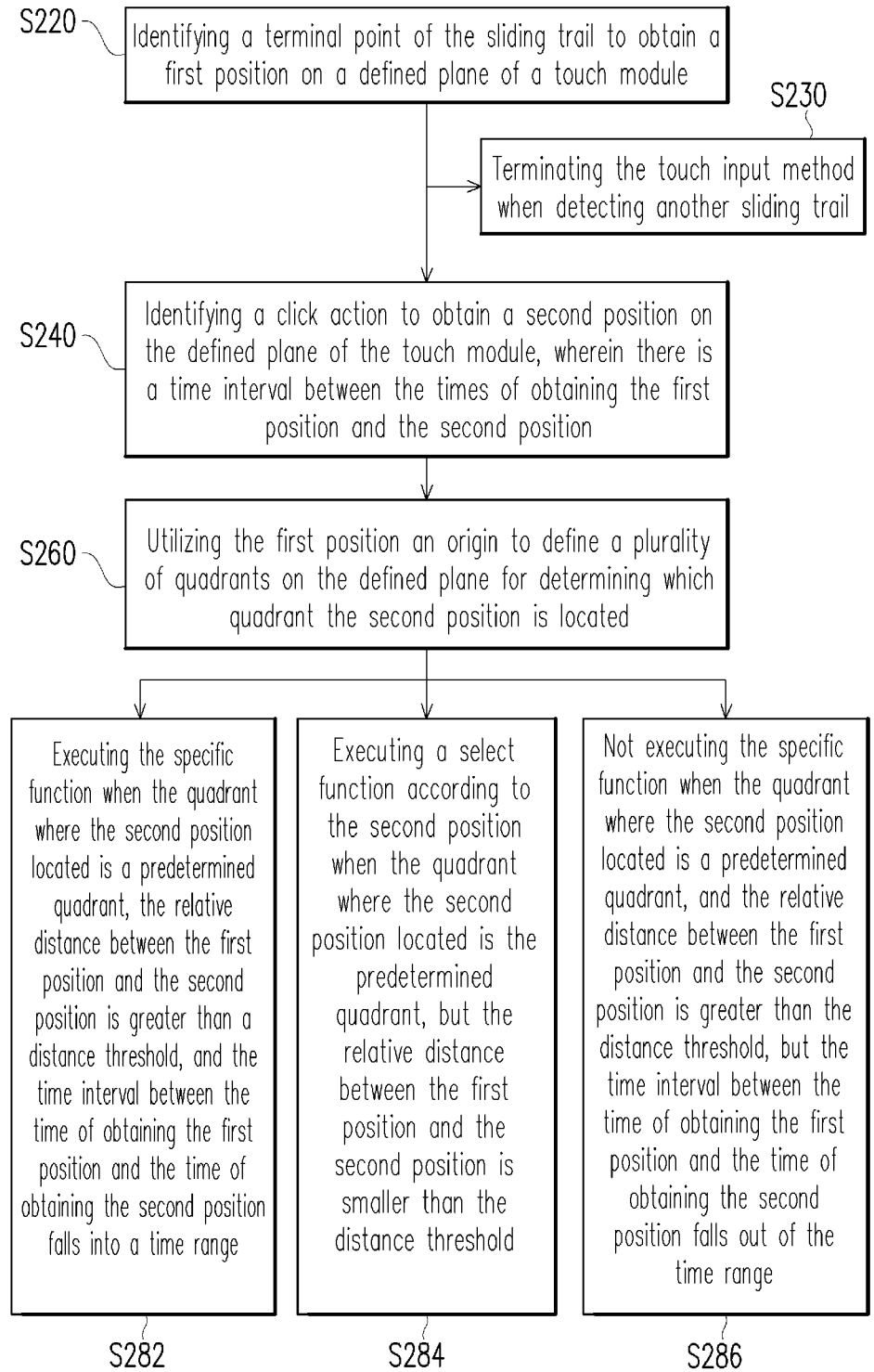
FIG. 2 is a detailed flowchart showing the touch input method according to an embodiment of the invention.
Figure 3:
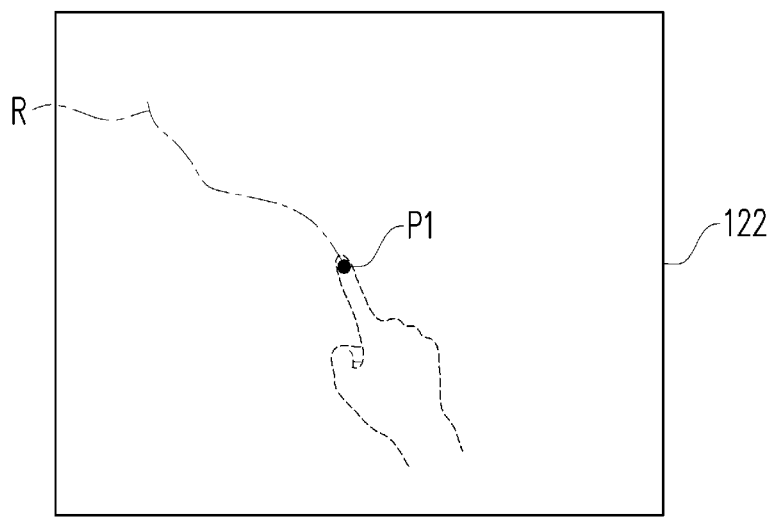
FIG. 3 is a schematic view showing obtaining a first position and a second position according to an embodiment of the invention.
Figure 3:
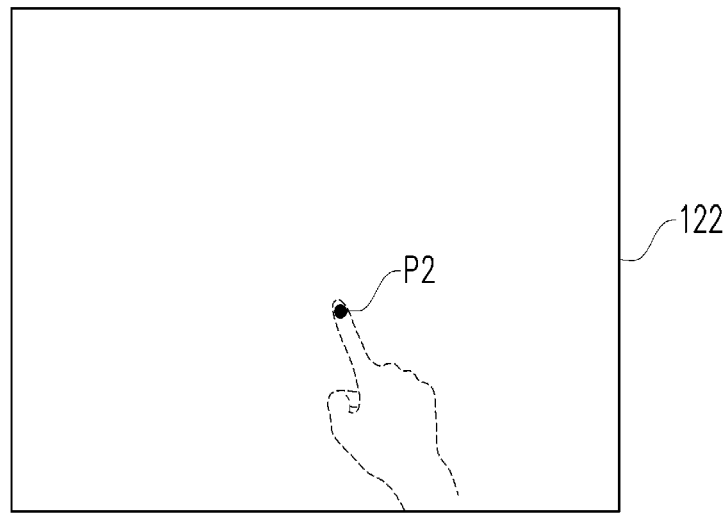

Details of the implementation of the touch input method is described with a plurality of embodiments in the following. FIG. 2 is a detailed flowchart showing the touch input method according to an embodiment of the invention. FIG. 3 is a schematic view showing obtaining a first position and a second position according to an embodiment of the invention. Referring to both FIGS. 2 and 3, with respect to a sliding trail R generated by the user's pressing and sliding on a defined plane 122 of the touch module, an electronic apparatus 10 identifies a terminal point of the sliding trail R to obtain a first position P1 (step S220). Next, with respect to a click action that the user makes on the touch module, the electronic apparatus 10 identifies a clicked position on the defined plane 122 to obtain a second position P2, wherein there is a time interval T between the times of obtaining the first position P1 and the second position P2 (step S240). In other words, the first position P1 and the second position P2 on the defined plane 122 and the time interval T are all recorded, and the first position P1 and the second position P2 are recorded, for example, via virtual coordinates on the defined plane 122. The virtual coordinates are, for example, a coordinate system set corresponding to a sensor pixel array within the touch module. From the viewpoint of the user, the embodiment in FIG. 3 means that on the defined plane 122 of the touch module, the user first generates the sliding trail R by sliding and then clicks the defined plane 112 at the second position P2 after the time interval T.

It is worth noting that after obtaining the first position P1 representing the terminal point of the sliding trail R, if the electronic apparatus 10 does not subsequently obtain the second position P2 corresponding to a click action but rather detects another sliding trail, the touch input method (the step S230) is terminated or the step S220 of the touch input method is resumed to obtain a first position P1 again.

Figure 4:
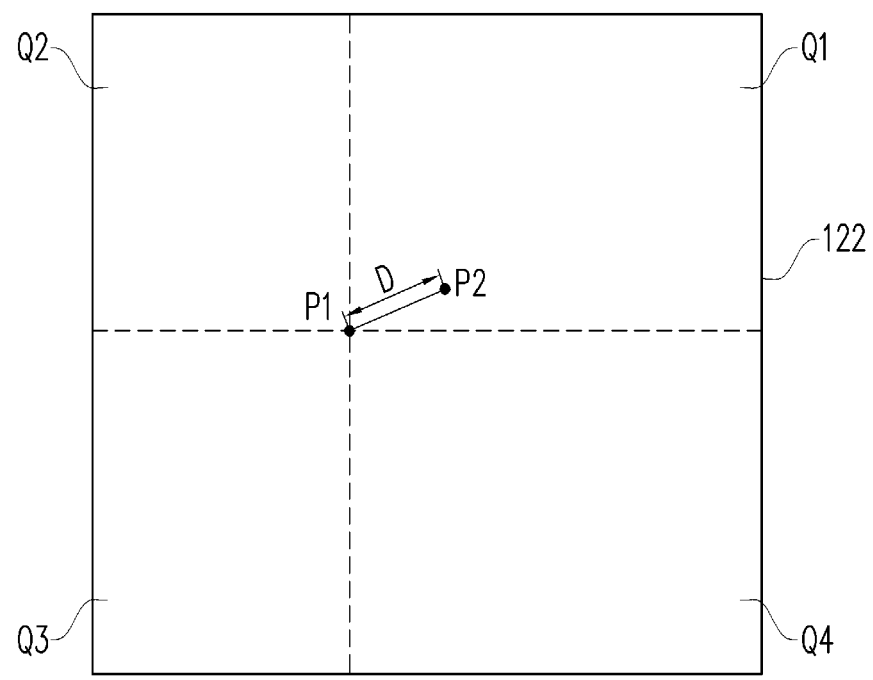
FIG. 4 is a schematic view showing determining a relative distance and a quadrant where the second position is located according to an embodiment of the invention.

FIG. 4 is a schematic view showing determining a relative distance and a quadrant where the second position is located according to an embodiment of the invention. Referring to both FIGS. 2 and 4, after the electronic apparatus 10 obtains the first position P1 and the second position P2, the first position P1 is utilized as an origin to define a plurality of quadrants, such as first to fourth quadrants Q1-Q4, on the defined plane 122. Thereby, a relative distance D between the first position P1 and the second position P2 and the quadrant where the second position P2 is located are determined (step S260, the second position P2 is located in the first quadrant Q1 as shown in FIG. 4 herein). More particularly, since the first position P1 and the second position P2 on the defined plane 122 are both recorded, the first position P1 may be utilized as the origin to specifically define the plurality of quadrants Q1-Q4 on the defined plane 122. Accordingly, it could be reckoned from the coordinate of the second position P2 on the defined plane 122 which quadrant the second position P2 falls into with respect to the first position P1, and the relative distance D between the first position P1 and the second position P2 may also be reckoned. The unit of the relative distance D takes, for example, the number of sensor pixels of the touch module as the unit for calculating the distance in the pixel numbers between the first position P1 and the second position P2 on the defined plane 122, and then to be converted into other length units, such as millimeter.

After obtaining the relative distance D between the first position P1 and the second position P2, the quadrant where the second position is located on the defined plane 122 and the time interval T, the electronic apparatus 10 further analyzes the intention of the user to determine whether to execute the specific function, such as calling the content menu. More particularly, in this embodiment, the electronic apparatus 10 first sets parameters such as a per-determined quadrant QS, a distance threshold $D_{th}$ and a time range $T_L$-$T_H$, and then compares the parameters with the relative distance D, the quadrant where the second position is located on the defined plane 122 and the time interval T to determine the intention of the user. In this embodiment, the predetermined quadrant QS is, for example, the fourth quadrant Q4 (or the third quadrant Q3) utilizing the first position P1 as the origin. The distance threshold $D_{th}$ is, for example, 5 millimeters, and the time range $T_L$-$T_H$ is, for example, 100-500 milliseconds.

Figure 5:
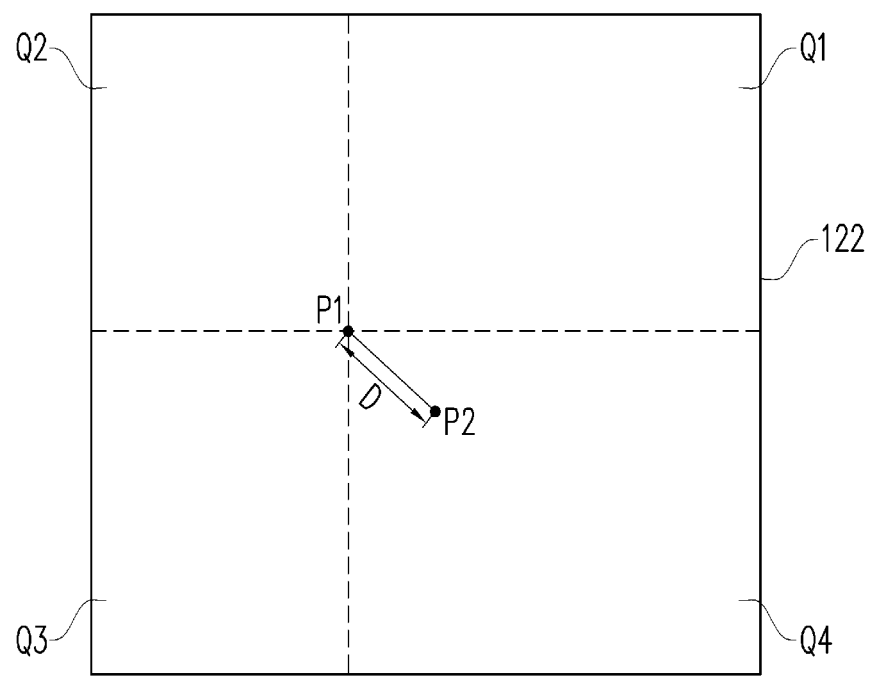
FIG. 5 is a schematic view showing the first position and the second position according to an embodiment of the invention.

FIG. 5 is a schematic view showing the first position and the second position according to an embodiment of the invention. Referring to both FIGS. 2 and 5, when the quadrant Q4 where the second position P2 located is a predetermined quadrant QS, the relative distance D between the first position P1 and the second position P2 is greater than or equal to the distance threshold $D_{th}$ and the time interval T between the time of obtaining the first position P1 and the time of obtaining the second position P2 falls into the time range $T_L$-$T_H$, the electronic apparatus 10 executes the specific function (step S282). From the viewpoint of the user, the embodiment of FIG. 5 means that after the sliding on the defined plane 122 is terminated, the user chooses to perform a click action at a position that is at least $D_{th}$ (distance threshold) away from the terminal point of the sliding and in a lower left or lower right direction of the terminal point of the sliding. In addition, the time interval from termination of the sliding to performance of the click action falls within the time range $T_L$-$T_H$. At this point, the electronic apparatus 10 determines that the user intends to execute a specific function and executes the specific function correspondingly. The specific function is, for example, calling the content menu, which corresponds to the action of right-clicking the mouse.

Figure 6:
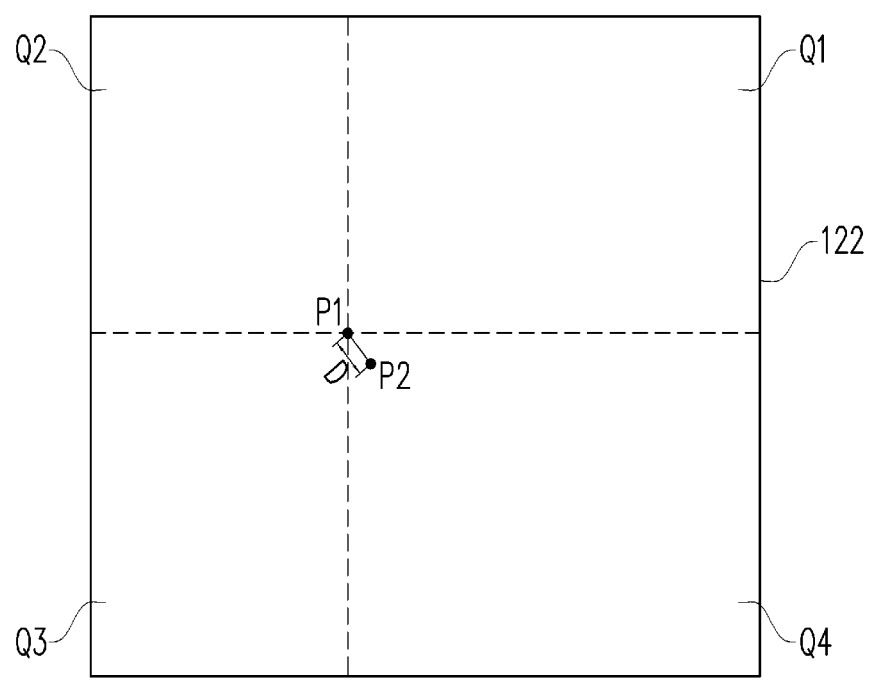
FIG. 6 is a schematic view showing a first position and a second position according to another embodiment of the invention.

FIG. 6 is a schematic view showing a first position and a second position according to another embodiment of the invention. Referring to both FIGS. 2 and 6, when the quadrant Q4 where the second position P2 located is the predetermined quadrant QS, but the relative distance D between the first position P1 and the second position P2 is smaller than the distance threshold $D_{th}$, the electronic apparatus 10 executes a select function according to the second position P2 (step S284). From the viewpoint of the user, the embodiment of FIG. 6 means that after the sliding on the defined plane 122 is terminated, the user chooses to perform a click action at a position close to the terminal point of the sliding. At this point, the electronic apparatus 10 determines that the user intends to control the cursor on the display screen and select the article indicated by the cursor. Therefore, the electronic apparatus 10 executes a select function according to the second position P2.

Referring again to FIG. 2, in another embodiment of the invention, when the quadrant where the second position P2 located is the predetermined quadrant QS, and the relative distance D is greater than the distance threshold $D_{th}$, but the time interval T falls out of the time range $T_L$-$T_H$, the electronic apparatus 10 does not execute the specific function (step S286). From the viewpoint of the user, this embodiment means that the time interval T from termination of the sliding to performance of the click action is lower than the lower limit $T_L$ of the time range or higher than the upper limit $T_H$ of the time range. More specifically, the time interval T being lower than the lower limit $T_L$ of the time range means that the click action may be an accidental touch, and the time interval T being higher than the upper limit $T_H$ of the time range means that the click action may be the beginning of another sliding or another manipulating behavior. Therefore, the electronic apparatus 10 does not execute the specific function under these circumstances so as to avoid false action.

Figure 7:
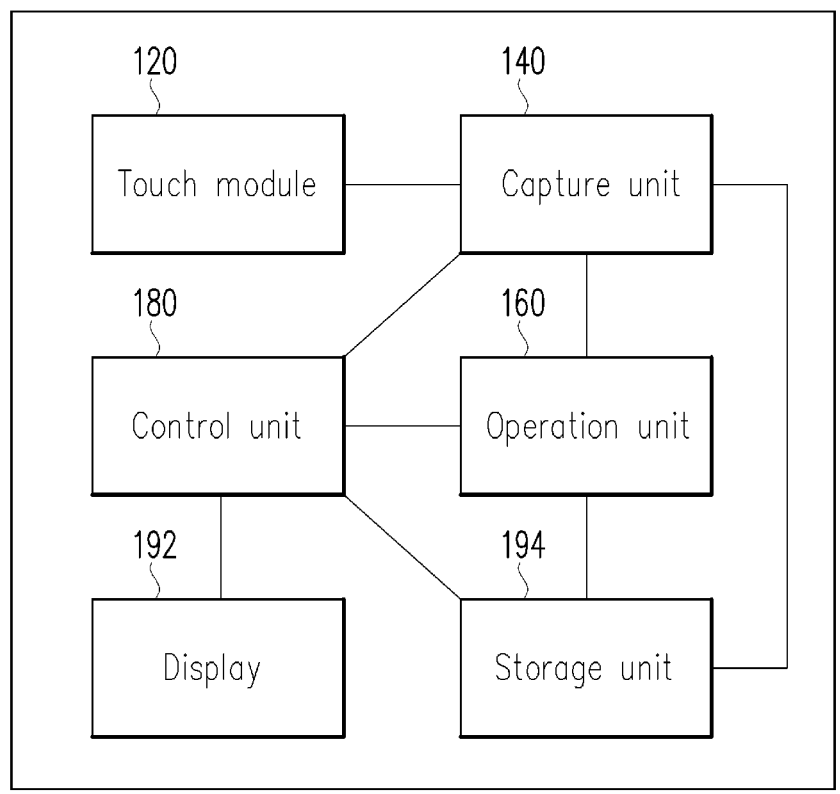
FIG. 7 is a schematic view showing an electronic apparatus according to an embodiment of the invention.

In other embodiments of the invention, an electronic apparatus actually using the touch input method is provided. FIG. 7 is a schematic view showing an electronic apparatus according to an embodiment of the invention. Referring to FIG. 7, in this embodiment, the electronic apparatus 10 includes a touch module 120, a capture unit 140, an operation unit 160 and a control unit 180. The touch module 120 has a defined plane 122, and the capture unit 140 is coupled to the touch module 120. On the defined plane 122 of the touch module 120, the capture unit 140 obtains a first position P1 of a terminal point of a sliding trail and obtains a second position P2 of a click action, wherein there is a time interval T between the times of obtaining the first position P1 and the second position P2.

The operation unit 160 is coupled to the capture unit 140 and utilizes the first position P1 as an origin to define a plurality of quadrants (for example, first fourth quadrants Q1-Q4) on the defined plane 122, so as to determine a relative distance D between the first position P1 and the second position P2 and the quadrant where the second position P2 is located. The control unit 180 is coupled to the capture unit 140 and the operation unit 160. According to the relative distance D, the quadrant where the second position is located and the time interval T, the control unit 180 determines whether to execute a specific function, and the specific function is, for example, calling the content menu.

In this embodiment, the electronic apparatus 10 may further, for example, include a display 192 and a storage unit 194. The display 192 is coupled to the control unit 180 and is used for displaying various articles and cursors on the display screen. By controlling the cursor on the display 192 via the touch module 120, the user is able to perform manipulations such as select, execute, drag, and call content menu. The storage unit 194 is coupled to the capture unit 140, the operation unit 160 and the control unit 180 for recording the first position P1 and the second position P2, the relative distance D, the time interval T, and even parameters such as the predetermined quadrant QS, the distance threshold $D_{th}$, and the time range $T_L$-$T_H$.

Please refer to the descriptions about the touch input method for the detailed operation and setup of the electronic apparatus 10, which is not repeated herein.

Based on the above, the touch input method and the electronic apparatus thereof provided in the invention determines whether to execute the specific function according the time interval between time of obtaining the first position and time of the second position, the relative distance between the first position and the second position and the quadrant where the second position is located with respect to the first position. Based on the embodiments, the user is able to execute the specific function via the manipulation on the touch module and thereby does not require the actual left and right keys to give commands for executing the special function. In other words, the user is able to use the touch module in a swifter manipulation manner, and the actual left and right keys may be omitted from the electronic apparatus to help simplify the design of the electronic apparatus.

Although the invention has been presented with reference to the above plurality of embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A touch input method adapted to a touch module, comprising:
    obtaining a first position of a terminal point of a sliding trail on a defined plane of the touch module, wherein the sliding trail is generated by a user pressing on the defined plane and then sliding to the terminal point;
    obtaining a second position of a click action on the defined plane of the touch module, wherein there is a time interval between the times of obtaining the first position and the second position;
    utilizing the first position as an origin to define a plurality of quadrants on the defined plane for determining a relative distance between the first position and the second position and for determining which quadrant the second position is located; and
    determining whether to execute a specific function according to the relative distance, the quadrant where the second position is located, and the time interval.

2. The touch input method as claimed in claim 1, wherein the specific function is to call a content menu.

3. The touch input method as claimed in claim 1, wherein a unit of the relative distance is pixel numbers.

4. The touch input method as claimed in claim 1, wherein the step of determining whether to execute the specific function further comprises:
    executing the specific function when the quadrant where the second position located is a predetermined quadrant, the relative distance is greater than a distance threshold, and the time interval falls into a time range.

5. The touch input method as claimed in claim 4, wherein the step of determining whether to execute the specific function further comprises:

executing a select function according to the second position when the quadrant where the second position located is the predetermined quadrant but the relative distance is smaller than the distance threshold.

6. The touch input method as claimed in claim 4, wherein the step of determining whether to execute the specific function further comprises:

not executing the specific function when the quadrant where the second position located is the predetermined quadrant, and the relative distance is greater than the distance threshold, but the time interval falls out of the time range.

7. The touch input method as claimed in claim 4, wherein the predetermined quadrant is a third quadrant or a fourth quadrant when the first position is utilized as the origin.

8. The touch input method as claimed in claim 4, wherein the distance threshold is 5 millimeters.

9. The touch input method as claimed in claim 4, wherein the time range is 100-500 milliseconds.

10. An electronic apparatus, comprising:
a touch module, having a defined plane;
a capture unit, coupled to the touch module, the capture unit obtaining a first position of a terminal point of a sliding trail on the defined plane of the touch module, wherein the sliding trail is generated by a user pressing on the defined plane and then sliding to the terminal point, and obtaining a second position of a click action on the defined plane of the touch module, wherein there is a time interval between the times of obtaining the first position and the second position;
an operation unit, coupled to the capture unit, wherein the operation unit utilizes the first position as an origin to define a plurality of quadrants on the defined plane for determining a relative distance between the first position and the second position and for determining which quadrant the second position is located; and
a control unit, coupled to the capture unit and the operation unit, wherein the control unit determines whether to execute a specific function according to the relative distance, the quadrant where the second position is located and the time interval.

11. The electronic apparatus as claimed in claim 10, wherein the specific function is to call a content menu.

12. The electronic apparatus as claimed in claim 10, wherein a unit of the relative distance is pixel numbers.

13. The electronic apparatus as claimed in claim 10, wherein the control unit executes the specific function when the quadrant where the second position located is a predetermined quadrant, the relative distance is greater than a distance threshold, and the time interval falls into a time range.

14. The electronic apparatus as claimed in claim 13, wherein the control unit executes a select function according to the second position when the quadrant where the second position located is the predetermined quadrant, but the relative distance is smaller than the distance threshold.

15. The electronic apparatus as claimed in claim 13, wherein the control unit does not execute the specific function when the quadrant where the second position located is the predetermined quadrant, and the relative distance is greater than the distance threshold, but the time interval falls out of the time range.

16. The electronic apparatus as claimed in claim 13, wherein the predetermined quadrant is a third quadrant or a fourth quadrant having the first position as the origin.

17. The electronic apparatus as claimed in claim 13, wherein the distance threshold is 5 millimeters.

18. The electronic apparatus as claimed in claim 13, wherein the time range is 100-500 milliseconds.

* * * * *